3,514,198
APPARATUS FOR PREVIEWING SLIDES
William F. Schacht, Cherry Hill, N.J., and William F. Fisher, Philadelphia, Pa., assignors to RCA Corporation, a corporation of Delaware
Filed Mar. 13, 1968, Ser. No. 712,713
Int. Cl. G03b 21/00
U.S. Cl. 353—21                     3 Claims

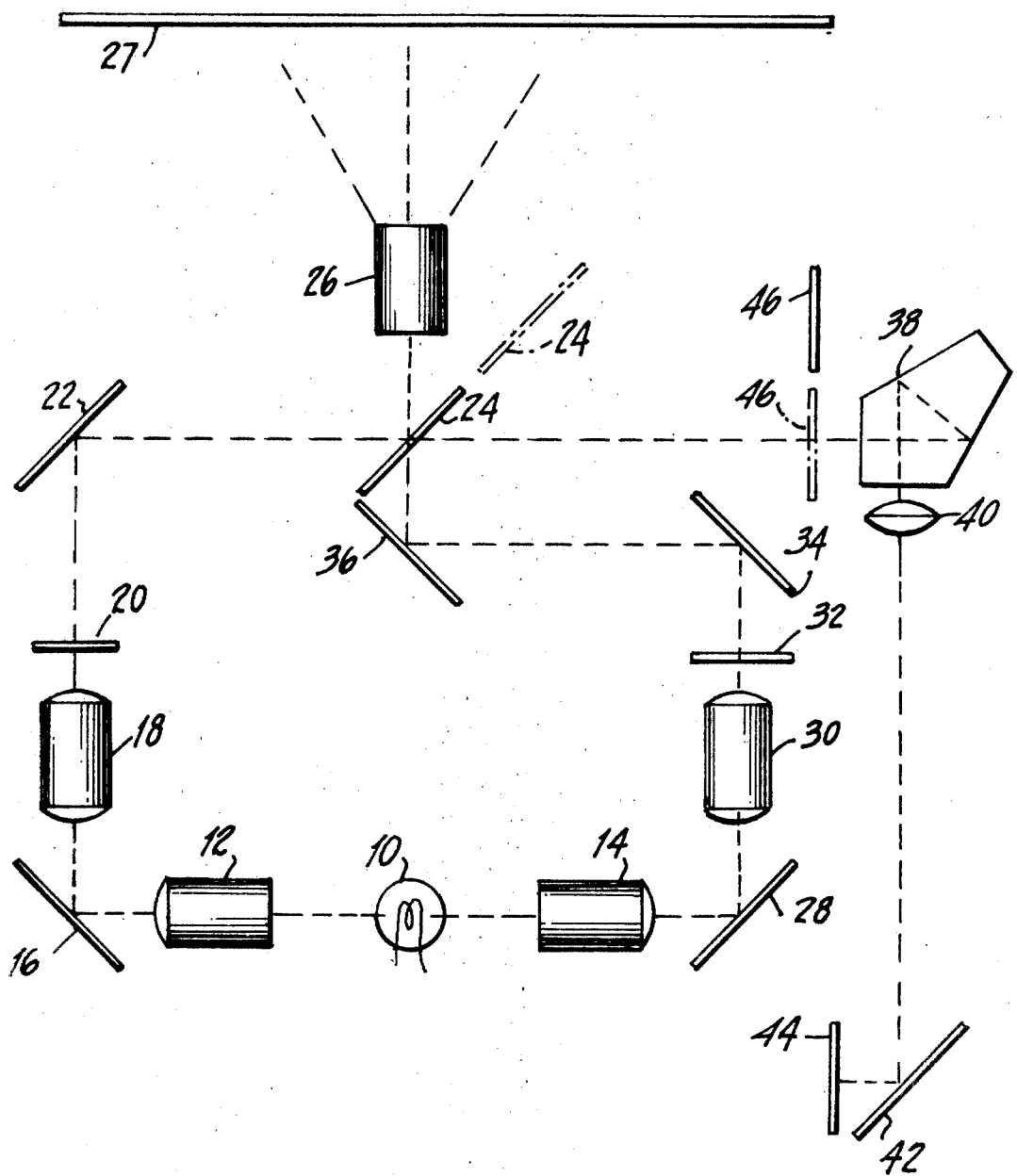

ABSTRACT OF THE DISCLOSURE

In a slide projector two modulated light beams are projected along paths that intersect. A double faced mirror is moveable between two positions, one, in the intersecting portion of the paths and the second, entirely out of said paths. In the first position of the mirror, one slide beam is deflected to a viewing screen by the front of the mirror and the other slide beam is deflected to a previewing screen by the back of the mirror. In the second position of the mirror the other slide beam continues to a viewing screen and the one slide beam continues to the previewing screen.

BACKGROUND

In projecting a series of slides, it becomes necessary on occasion to check a slide that is to be viewed next to be sure that the slides as being shown are arranged in the correct order.

It is an object of this invention to provide an improved apparatus for viewing a slide that is about to be projected.

It is another object of this invention to provide a slide previewer for viewing one of two slides which are both in slide projecting position while the other of the two slides is being projected on the viewing screen.

A dual slide projector is provided which includes a mirror moveable between two positions. In one of its two positions, the mirror causes a slide which is in one of two slide projecting positions to be projected on a screen or on a field lens if it is to be transmitted. The mirror when it is in the other of its two positions, permits the projection of another slide that is in the second of the two slide projecting positions on the screen. In accordance with this invention, a double faced mirror is used and slide previewing means are provided for the operator. In the one position of the double faced mirror, the back face of the mirror directs the light beam from the slide that is in the second projection position, and is not being projected on the screen, onto the operator's previewing means. In the other position of the double faced mirror, the light from the slide in the one projecting position is directed to the operator's previewing means.

DESCRIPTION

The invention will be better understood upon reading the following description in connection with the accompanying drawing of which the single figure illustrates an apparatus including the invention.

A dual slide projector is provided including a projector lamp 10, which throws a light beam into an upper condenser lens system 12 and which also throws a light beam into a lower condenser lens system 14. The light beam from the lens 12 strikes a mirror 16 which is positioned at a 45 degree angle with respect to the axis of the lens system 12. The light striking the mirror 16 is deflected 90 degrees and goes through a focusing lens system 18. The light from the focusing lens system 18 goes through an upper slide gate 20 or image producer and then is deflected downward in a direction parallel to the axis of the lens system 12, by another mirror 22. The light beam from the mirror 22 hits one, i.e. the front, reflecting face of a double face mirror 24 and enters a projection lens system 26 and is projected on a screen 27, for example, in a known manner. The mirror 24 is moveable in its own plane between a position, shown in solid lines in the figure, where the light beam from the mirror 22 hits one face of the mirror 24 and is reflected thereby, and another position shown in dotted lines in the figure, where the light beam from the mirror 22 does not hit the mirror 24 but continues undeflected for a purpose to be explained.

The light beam from the condenser lens 14 hits a mirror 28 and is reflected into a path parallel to the axis of the lens system 18 and also in a direction towards the screen 27. The light beam reflected from the mirror 28 passes through a lens system 30 and through a second, slide gate 32. After the light beam has passed through the slide gate or image producer 32, the light beam is deflected upwardly by a mirror 34 into a path parallel to the axis of the lens system 14. However, the mirror 34 is so positioned that the path of the light reflected therefrom is closer to the light source than the path of the light reflected from the mirror 22. Mirror 36 is positioned and arranged to reflect the light beam from the mirror 34 into line with the light beam that is reflected from, one i.e. the front, reflecting face of the mirror 24, and traveling in the same direction. It will be noted that the mirror 24 is positioned, when it is in its light reflecting position at the intersection of the light beams that are reflected by the mirrors 22 and 36. When the mirror 24 is in its light reflecting position, the other or back face thereof reflects the light from the mirror 36 into line with the light beam that is reflected by the mirror 22. Therefore, when the mirror 24 is in its light reflecting position, that is in the position shown in solid lines in the figure, the slide in the gate 20 is projected on the screen 27 and the slide in the gate 32 is projected by the back of the mirror 24 in a downward direction and parallel to the axis of the lens system 14. When the mirror 24 is in its non-reflecting position, as shown in dotted lines in the figure the slide in the gate 32 is projected on the screen 27 and the slide in the gate 20 is projected by the mirror 22 downwardly and in a direction parallel with the axis of the lens system 14 and in line with the light beam that would have been reflected by the back face of the mirror 24 if it were in its light reflecting position.

A reflecting prism 38 is so positioned that the light from the mirror 22 or the light from the back of the mirror 24 will be projected thereon. The reflecting prism 38 does not invert the picture projected thereon nor does the prism 38 turn the picture from left to right. The prism 38 directs the light beam that hits it back in a general direction towards the source of light 10. The light beam from the prism 38 is passed through a previewing lens 40 and the light beam, after passing the lens 40 is again reflected by a mirror 42 onto a conveniently positioned frosted previewing screen 44. If desired, an opaque vane 46 may be provided which is moveable between the position shown in solid lines in which the light beam is permitted to hit the prism 38, and the position shown in dotted lines in which it cuts off the beam. The vane 46 is in its light cut off position while an image producer is being changed in the gate 20 or 32 to prevent forming of a changing image on the previewing screen during this period.

Light, as modulated by the slide in the gate 20 is projected on the screen 27 when the mirror 24 is in its reflecting position and light as modulated by the slide in the gate 32 will appear on the previewing screen 44 simultaneously therewith. Furthermore, when the mirror 24 is in its non-reflecting position, light, as modulated by the slide in the gate 32 will be projected on the screen 27 and simultaneously therewith light which is modulated by the slide in the gate 20 will appear on a previewing screen 44. Since the slide in gate 20 is changed while the slide in gate 32 is being shown, and since the slide in gate 32 is changed while a slide in gate 20 is being shown, the operator sees each slide after it is in slide projecting position but before it is projected, whereby he may determine whether the next slide to be projected is the correct one.

Modifications of the above described previewer will be evident to a person skilled in the art. For example, the light beam which passes through the gate 32 may go in a straight direct line from the source of light 10 through the required lens system such as 14 and 30 directly towards the projection lens 26, instead of in the indirect path as noted hereinabove. The lens system 30 and cooperating elements may be above the lens system 18 and its cooperating elements, or the lens systems may be side-by-side, instead of as described. Furthermore, the previewing screen may be positioned above, or to either side of the dual projector or at any other position that is convenient for the projector operator, instead of as shown. The description should therefore be taken as descriptive and not in a limiting manner.

What is claimed is:

1. A slide projector comprising means to pass beams of light along two different paths there being a slide gate in each of said paths,
   at least a portion of one of said paths extending in a slide projecting direction and at least a portion of said other path extending in a direction to intersect said one path and also in a direction towards at least a portion of a previewing means,
   a double faced mirror each face of which is reflective but substantially non-transmissive moveable between two positions; in one position thereof said mirror being out of the path of both of said beams whereby said one beam continues in its projection direction and said other beam continues in a direction to appear on said previewing means, and in the other position thereof one face of said mirror directs said other beam in said slide projecting direction and the other face of said mirror directs said one beam in a direction to appear on said previewing means.

2. In an apparatus having first and second image producing means and including projecting means and previewing means, the combination comprising:
   means arranged to provide a path for a light beam through said first image producer to said projecting means and for simultaneously providing a path for a second light beam through said second image producer to said previewing means; and
   beam transposing means moveable between first and second positions, the positions of said beam transposing means being arranged in relation to said light paths such that movement of said beam transposing means from either of said positions to the other of said positions causes at least a portion of said first and second light paths to be simultaneously transposed.

3. The invention according to claim 2 wherein, said beam transposing means includes a double faced mirror each face of which is reflective but substantially non-transmissive.

References Cited

UNITED STATES PATENTS

| 2,858,731 | 11/1958 | Rehorn. |
| 3,249,002 | 5/1966 | Roop. |
| 3,348,449 | 10/1967 | Zillmer _____ 353—21 |
| 3,447,869 | 6/1969 | Szymber. |

NORTON ANSHER, Primary Examiner

R. L. MOSES, Assistant Examiner

U.S. Cl. X.R.

353—82, 98